United States Patent
Mizuguchi et al.

(10) Patent No.: US 9,600,468 B2
(45) Date of Patent: Mar. 21, 2017

(54) DICTIONARY CREATION DEVICE, WORD GATHERING METHOD AND RECORDING MEDIUM

(75) Inventors: Hironori Mizuguchi, Tokyo (JP); Yukitaka Kusumura, Tokyo (JP); Dai Kusui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 525 days.

(21) Appl. No.: 13/515,181

(22) PCT Filed: Dec. 3, 2010

(86) PCT No.: PCT/JP2010/071695
§ 371 (c)(1),
(2), (4) Date: Aug. 23, 2012

(87) PCT Pub. No.: WO2011/070979
PCT Pub. Date: Jun. 16, 2011

(65) Prior Publication Data
US 2012/0310944 A1    Dec. 6, 2012

(30) Foreign Application Priority Data
Dec. 11, 2009    (JP) ................ 2009-282305

(51) Int. Cl.
G06F 17/30 (2006.01)
G06F 17/27 (2006.01)

(52) U.S. Cl.
CPC .... G06F 17/2735 (2013.01); G06F 17/30731 (2013.01)

(58) Field of Classification Search
CPC ........... G06F 17/2735; G06F 17/30657; G06F 17/30734; G06F 17/30864; G06F 17/30707
(Continued)

(56) References Cited

U.S. PATENT DOCUMENTS

2002/0099730 A1* 7/2002 Brown ................ G06F 17/3061
    715/256
2003/0140309 A1* 7/2003 Saito et al. ................... 715/500
(Continued)

FOREIGN PATENT DOCUMENTS

JP    2004-334766 A    11/2004
JP    2007-207218 A    8/2007
(Continued)

OTHER PUBLICATIONS

Mizuguchi, Hiroki, et al., "Web Chishiki o Riyo shita Bootstrap ni yoru Jisho Zoshoku Shuho," The Institute of Electronics, Information and Communication Engineers, Proceedings of the 18th Data Engineering Workshop, Jun. 1, 2007, http://www.ieici.org./iss/de/DEWS/DEWS2007/pdf/e8-5.pdf.

(Continued)

Primary Examiner — Monica Pyo
(74) Attorney, Agent, or Firm — Sughrue Mion, PLLC

(57) ABSTRACT

A boundary word identification unit (103) identifies a boundary word belonging to a plurality of categories among words gathered in dictionary growth processing. Then, a category membership degree calculation unit (104) calculates, for each category to which the boundary word belongs, a category membership degree indicating a degree to which the boundary word belongs to the category on the basis of information recorded in a gathering process memory unit (108). Next, a category update unit (105) determines the category to which the boundary word belongs on the basis of the category membership degree calculated by the category membership degree calculation unit (104) and updates information stored in a gathered-by-category word memory unit (109) so that the determination result is reflected.

9 Claims, 15 Drawing Sheets

(56) References Cited

U.S. PATENT DOCUMENTS

| | | |
|---|---|---|
| 2005/0211071 A1* | 9/2005 | Lu et al. .................... 84/611 |
| 2009/0070295 A1* | 3/2009 | Otomori et al. ................ 707/3 |
| 2009/0216692 A1 | 8/2009 | Saito et al. |
| 2011/0213796 A1* | 9/2011 | Kiyota et al. ............... 707/769 |

FOREIGN PATENT DOCUMENTS

| | | |
|---|---|---|
| JP | 2007-249600 A | 9/2007 |
| JP | 2007-304950 A | 11/2007 |

OTHER PUBLICATIONS

Oshima, Hiroaki, et al., "Seikaigo Pair Zenzo ni yoru Kanrengo Shutoka no Tameno Ryohoko Kobun Pattern Hakken," The 1st Forum on Data Engineering and Information Management-DEIMFORUM-Ronbunshu, May 9, 2009, URL:http://db-event.jpn.org/deim2009/proceedings/files/B9-1.pdf.

Kawai, Hideki, et al., "Cost-Effective Search Strategy for Bootstrapping Lexicon Acquisition," Information Processing Society of Japan, Jun. 2008, pp. 36-48, vol. 1, No. 1.

Fujigaki, Yuko, et al., "Kenkyu Hyoka Kagakuron no Tameno Kagaku Keiryogaku Nyumon," 1st Edition, Maruzen Co., Ltd., Mar. 30, 2004, pp. 67-72.

Mizuguchi, Hironori, et al., "Bootstrapped Dictionary Growth Method Using Web Knowledge," DEWS2007, 2007.

Communication dated Feb. 17, 2015 from the Japanese Patent Office in counterpart application No. 2011-545193.

\* cited by examiner

FIG. 2

GATHERING PROCESS MEMORY UNIT

| TURN NUMBER | INPUT WORD | OUTPUT WORD |
|---|---|---|
| 1 | RESTAURANT S | RESTAURANT X |
| 1 | RESTAURANT S | RESTAURANT Z |
| 1 | RESTAURANT S | RESTAURANT W |
| 1 | RESTAURANT T | RESTAURANT X |
| 1 | RESTAURANT T | RESTAURANT Z |
| 1 | RESTAURANT T | RESTAURANT W |
| 1 | NOODLE C | NOODLE G |
| 1 | NOODLE C | NOODLE H |
| 1 | NOODLE D | NOODLE G |
| 1 | NOODLE D | NOODLE H |
| 2 | RESTAURANT X | RESTAURANT A |
| 2 | RESTAURANT S | RESTAURANT A |
| 2 | RESTAURANT S | RESTAURANT B |
| 2 | RESTAURANT Z | NOODLE I |
| 2 | RESTAURANT W | NOODLE J |
| 2 | RESTAURANT Z | NOODLE I |
| 2 | RESTAURANT W | NOODLE J |
| 2 | NOODLE G | NOODLE I |
| 2 | NOODLE H | NOODLE I |
| 2 | NOODLE G | NOODLE J |
| 2 | NOODLE H | NOODLE J |
| 3 | RESTAURANT A | RESTAURANT E |
| 3 | RESTAURANT A | RESTAURANT T |
| 3 | RESTAURANT B | RESTAURANT T |
| ... | ... | ... |

FIG. 3

GATHERED-BY-CATEGORY WORD MEMORY UNIT

| CATEGORY NAME | WORD |
|---|---|
| RESTAURANT | RESTAURANT S |
| | RESTAURANT T |
| | RESTAURANT Z |
| | RESTAURANT W |
| | RESTAURANT A |
| | RESTAURANT B |
| | RESTAURANT X |
| | RESTAURANT E |
| | NOODLE I |
| | NOODLE J |
| NOODLE SHOP | NOODLE C |
| | NOODLE D |
| | NOODLE G |
| | NOODLE H |
| | NOODLE I |
| | NOODLE J |
| ... | ... |

FIG. 11

GATHERED-BY-CATEGORY WORD MEMORY UNIT

| CATEGORY NAME | WORD | CLUSTER NAME |
|---|---|---|
| RESTAURANT | RESTAURANT S | |
| | RESTAURANT T | |
| | RESTAURANT Z | |
| | RESTAURANT W | |
| | RESTAURANT A | CLUSTER 1 |
| | RESTAURANT B | CLUSTER 1 |
| | RESTAURANT X | |
| | RESTAURANT E | |
| | NOODLE I | |
| | NOODLE J | |
| NOODLE SHOP | NOODLE C | |
| | NOODLE D | |
| | NOODLE G | |
| | NOODLE H | |
| | NOODLE I | CLUSTER 2 |
| | NOODLE J | CLUSTER 2 |
| ... | ... | ... |

DICTIONARY CREATION DEVICE, WORD GATHERING METHOD AND RECORDING MEDIUM

CROSS REFERENCE TO RELATED APPLICATION

This application is a National Stage of International Application No. PCT/JP2010/071695, filed on Dec. 3, 2010, which claims priority from Japanese Patent Application No. 2009-282305, filed on Dec. 11, 2009, the contents of all of which are incorporated herein by reference in their entirety.

TECHNICAL FIELD

The present invention relates to a dictionary creation device, a word gathering method and a recording medium.

BACKGROUND ART

A dictionary creation method has been known in which a dictionary is created by gathering multiple similar words from document data, Web pages and/or the like using a small number of similar words. A dictionary in this sense is a collection of similar words having a common superordinate concept.

One example of the above-described dictionary creation method is disclosed in Non-Patent Literature 1. An overview of this dictionary creation method is shown below.

First, a small number of words to be used in gathering are input. Below, this small number of words input at first are called seed words. Next, Web pages containing the seed words are gathered using a Web search engine. Next, a pattern is created that divides the seed words from other words from the gathered Web pages. Then words are extracted from the Web pages using this pattern and are added to the seed words. From when the seed words are input until the words are extracted is called a turn. Furthermore, Web pages are further gathered using the seed words to which the words have been added. After this is repeated for a number of turns, the extracted words are output as a collection (dictionary) of words similar to the seed words.

PRIOR ART LITERATURE

Non-Patent Literature

Non-Patent Literature 1: Hironori Mizuguchi, Hideki Kawai, Masaaki Tsuchida, Dai Kusui: Bootstrapped dictionary growth method using Web knowledge, DEWS2007, 2007

DISCLOSURE OF INVENTION

Problems to be Solved by the Invention

Let us consider the case of gathering words in a plurality of categories using the above-described dictionary creation method. For example, consider the case of gathering words belonging to the categories of restaurant names, noodle shop names and ramen shop names.

In this case, dictionary creation is accomplished by inputting seed words belonging to each category, and separate similar words are gathered for each category. However, when words are gathered using this kind of method, because the patterns created from the seed words belonging to each category mutually resemble each other, there is a concern that words redundantly belonging to multiple categories could appear. For example, there may be cases in which words belonging to all of the categories of restaurant names, noodle shop names and ramen shop names appear. In this case, it is unclear into which category words belonging to multiple categories should ultimately be classified appropriately, making appropriate word gathering by category troublesome.

In consideration of the foregoing, it is an object of the present invention to provide a dictionary creation device, a word gathering method and a recording medium that can appropriately classify gathered words into categories even when similar words are gathered using a dictionary growth process targeting multiple categories.

Means for Solving the Problems

In order to achieve the above object, the dictionary creation device according to a first aspect of the present invention comprises:

an input/output process recording means for recording information indicating an input/output process for input words and output words output relating to said input words, in a dictionary growth process for gathering words in each category by repeatedly receiving input of words in each category, outputting from document data words related to the input words that were input, adding the output words to the input words until prescribed conditions are reached and outputting from document data words related to the input words;

a gathered-by-category word memory means for storing words gathered by the dictionary growth process by category;

a boundary word identification means for identifying boundary words belonging to multiple categories out of the words gathered by the dictionary growth process;

a category membership degree calculation means for calculating a category membership degree indicating the extent to which a boundary word belongs to the categories for each category to which the boundary word belongs, so that the category membership degree may become high, when the boundary word turns into an input word of the category, or when the boundary word turns into an output word of the category, on the basis of the information recorded in the input/output process recording means; and a category update means for determining categories to which the boundary words belong on the basis of category membership degrees calculated by the category membership degree calculation means, and updating information stored in the gathered-by-category word memory means so as to reflect the determination results.

In addition, a word gathering method according to a second aspect of the present invention comprises:

an input/output process recording step for recording information indicating an input/output process for input words and output words output relating to said input words, in a dictionary growth process for gathering words in each category by repeatedly receiving input of words in each category, outputting from document data words related to the input words that were input, adding the output words to the input words until prescribed conditions are reached and outputting from document data words related to the input words;

a gathered-by-category word memory step for storing words gathered by the dictionary growth process by category;

a boundary word identification step for identifying boundary words belonging to multiple categories out of the words gathered by the dictionary growth process;

a category membership degree calculation step for calculating a category membership degree indicating the extent to which the boundary words belong to the categories for each category to which the boundary words belong, so that the category membership degree may become high, when the boundary word turns into an input word of the category, or when the boundary word turns into an output word of the category, on the basis of the information recorded in the input/output process recording step; and a category update step for determining categories to which the boundary words belong on the basis of category membership degrees calculated by the category membership degree calculation step, and updating information stored in the gathered-by-category word memory step so as to reflect the determination results.

In addition, a recording medium according to a third aspect of the present invention is a computer-readable recording medium on which is recorded a program that causes a computer to function as:

an input/output process recording means for recording information indicating an input/output process for input words and output words output relating to said input words, in a dictionary growth process for gathering words in each category by repeatedly receiving input of words in each category, outputting from document data words related to the input words that were input, adding the output words to the input words until prescribed conditions are reached and outputting from document data words related to the input words;

a gathered-by-category word memory means for storing words gathered by the dictionary growth process by category;

a boundary word identification means for identifying boundary words belonging to multiple categories out of the words gathered by the dictionary growth process;

a category membership degree calculation means for calculating a category membership degree indicating the extent to which the boundary words belong to the categories for each category to which the boundary words belong, so that the category membership degree may become high, when the boundary word turns into an input word of the category, or when the boundary word turns into an output word of the category a category update means for determining categories to which the boundary words belong on the basis of category membership degrees calculated by the category membership degree calculation means, and updating information stored in the gathered-by-category word memory means so as to reflect the determination results.

Efficacy of the Invention

With the present invention, category membership is calculated for a word belonging to multiple categories, and the word is classified into the optimum category based on category membership degree. Accordingly, it is possible to appropriately classify gathered words into categories even when similar words are gathered using a dictionary growth process targeting multiple categories.

BRIEF DESCRIPTION OF DRAWINGS

FIG. 2 is a drawing showing an exemplary composition of information recorded in a gathering process memory unit;

FIG. 3 is a drawing showing an exemplary composition of information recorded in a gathered-by-category word memory unit;

FIG. 11 is a drawing showing an exemplary composition of information recorded in the gathered-by-category word memory unit;

BEST MODE FOR CARRYING OUT THE INVENTION

Figure 1:
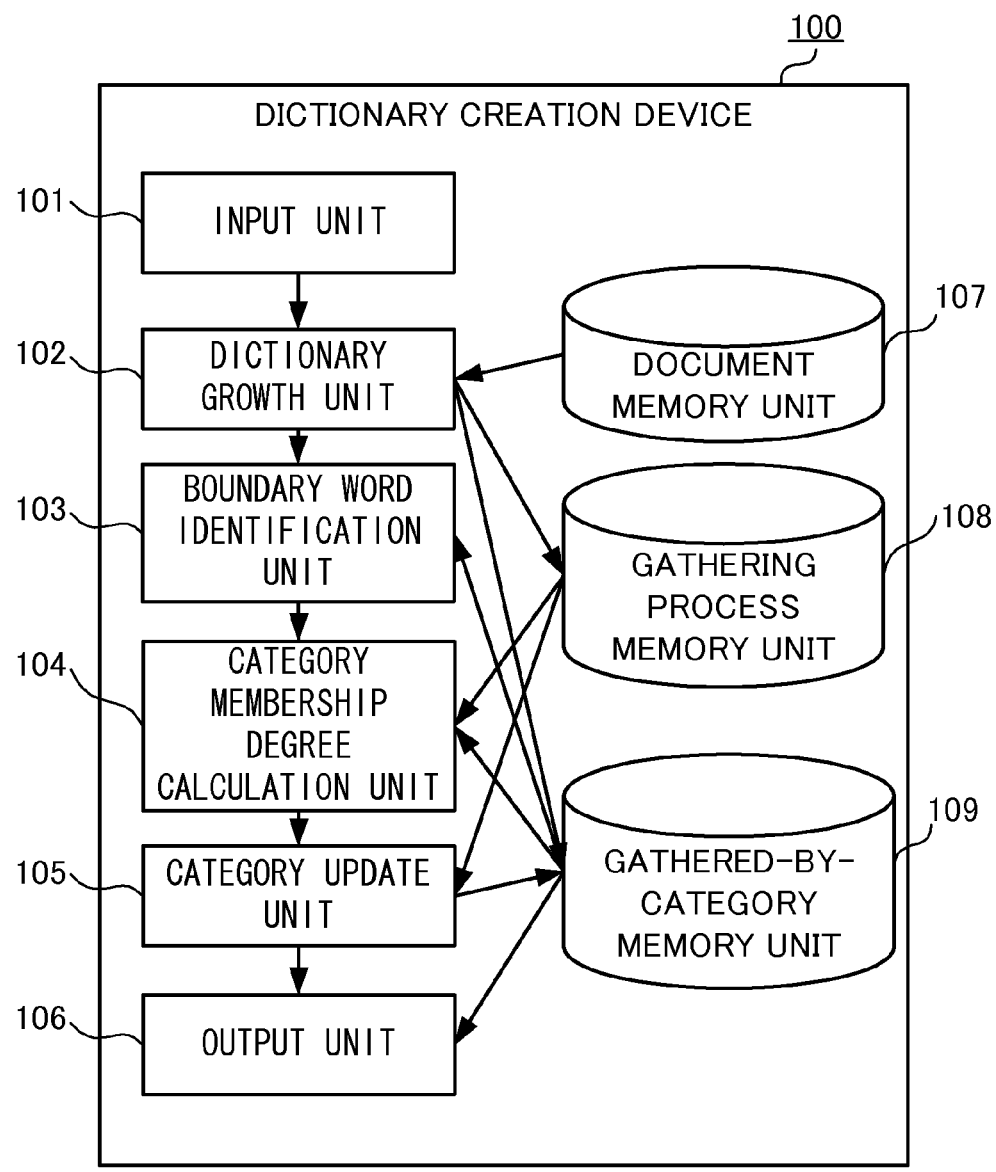
FIG. 1 is a drawing showing the composition of a dictionary creation device according to a first embodiment of the present invention.

Below, the preferred embodiments of the present invention are described in detail with reference to the drawings. The present invention is not limited by the below-described embodiments and drawings, for the below-described preferred embodiments and drawings can be altered without altering the scope of the present invention. In addition, identical or corresponding components in the drawings are labeled with the same reference numbers.

In addition, in the present invention a dictionary is a collection of similar words having a common superordinate concept.

First Embodiment

A dictionary creation device 100 according to a first preferred embodiment of the present invention will be described. As shown in FIG. 1, the dictionary creation device 100 is provided with an input unit 101, a dictionary growth unit 102, a boundary word identification unit 103, a category membership degree calculation unit 104, a category update unit 105, an output unit 106, a document memory unit 107, a gathering process memory unit 108 and a gathered-by-category word memory unit 109.

The input unit 101 is composed of a keyboard, mouse and/or the like. Via the input unit 101, the user inputs multiple words (seed words) as samples for creating a dictionary (collection of similar words), and titles (category names) of classifications (categories) to which the seed words respectively belong. In the present invention, category names and seed words are input in multiple categories.

The dictionary growth unit 102 accomplishes a dictionary growth process that gathers words similar to the seed words from documents stored in the document memory unit 107, using a conventional method such as that described in Non-Patent Literature 1. In addition, in this dictionary growth process the dictionary growth unit 102 stores in the gathering process memory unit 108 information indicating what kind of process by which the words have been gathered. Details of the dictionary growth process accomplished by the dictionary growth unit 102 are described below.

The boundary word identification unit 103 identifies words (boundary words) classified redundantly in multiple categories, by referencing the gathered-by-category word memory unit 109.

The category membership degree calculation unit 104 calculates a category membership degree indicating the degree to which a boundary word belongs to a category for each category to which a boundary word belongs, on the basis of information stored in the gathering process memory unit 108 and the gathered-by-category word memory unit 109. Specifically, the category update unit 105 calculates the shortest arrival distance (number of turns) for a boundary word to arrive at a seed word and a category closeness indicating the degree of connection among words in a category, for each category to which the boundary word belongs, and calculates the category membership degree based on this calculated information. Details of the process accomplished by the category membership degree calculation unit 104 are described below.

The category update unit 105 determines the category to which a boundary word belongs on the basis of the category membership degree calculated by the category membership degree calculation unit 104, and updates the gathered-by-category word memory unit 109 so that this determination result is reflected. Details of the process accomplished by the category update unit 105 are described below.

The output unit 106 outputs various information. For example, the output unit 106 outputs (displays) words gathered by the dictionary growth process, appending the category name to which that word belongs.

The document memory unit 107 stores data defining various documents that are targets of word gathering by the dictionary growth unit 102. An ID (document ID) is attached to the data of each document.

In the dictionary growth process, information indicating by what kind of input and output process a word was gathered is stored in the gathering process memory unit 108. Specifically, as shown in FIG. 2, for each turn in the dictionary growth process the turn number of that turn, the input word input by that turn and output words output by a pattern created from that input word are stored associated with each other in the gathering process memory unit 108.

For example, from the lead entry in FIG. 2, on the first turn on the dictionary growth process "Restaurant X" is extracted by a pattern created from "Restaurant S".

Returning to FIG. 1, the gathered words and category names indicating into which categories the words have been classified are stored, associated with each other, in the gathered-by-category word memory unit 109.

For example, from FIG. 3 it can be seen that "Restaurant S", "Restaurant T", "Restaurant Z", "Restaurant W", "Restaurant A", "Restaurant B", "Restaurant X", "Restaurant E", "Noodle I" and "Noodle J" are words belonging to the restaurant category. In addition, "Noodle C", "Noodle D", "Noodle G", "Noodle H", "Noodle I" and "Noodle J" are words belonging to the noodle shop category. In addition, it can be seen that "Noodle I" and "Noodle J" are boundary words belonging to both the restaurant category and the noodle shop category.

Next, actions of processes implemented by the dictionary creation device 100 will be described.

Figure 4:
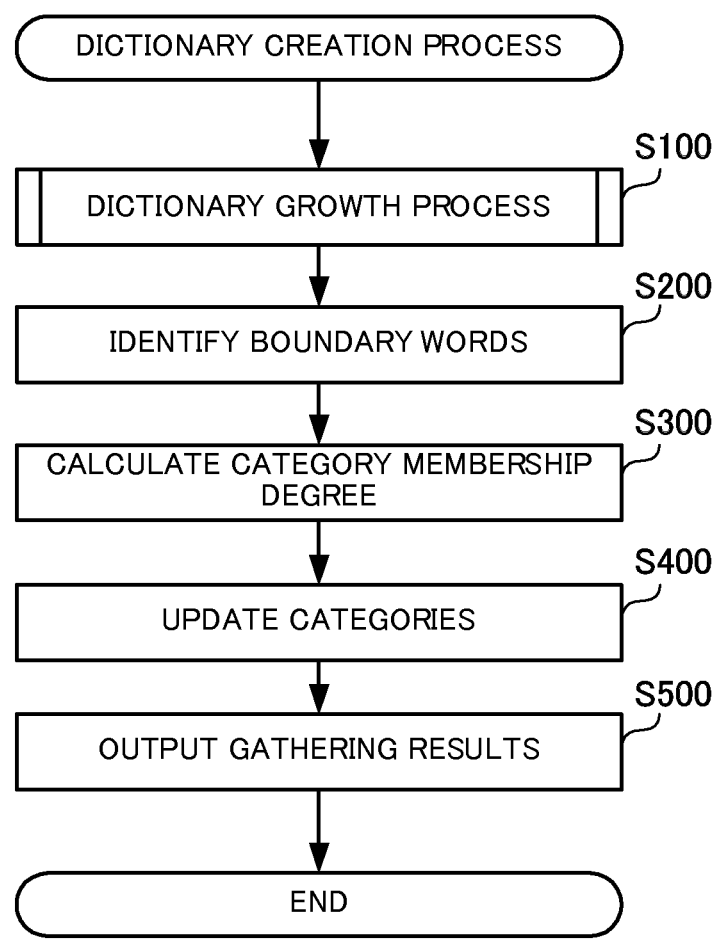
FIG. 4 is a flowchart for explaining actions of the dictionary creation process.

The user operates the input unit 101 to input multiple categories (category names) and one or multiple seed words for each category. Furthermore, the user directs that a dictionary that is a collection of similar words for each category be created based on the input seed words. The dictionary creation device 100 accomplishes the dictionary creation process shown in FIG. 4 in accordance with this directive operation.

When the dictionary creation process is started, first the dictionary growth unit 102 accomplishes a dictionary growth process using a conventional method, and words related to the input seed words are gathered into the different input categories (category names) (step S100).

Figure 5:
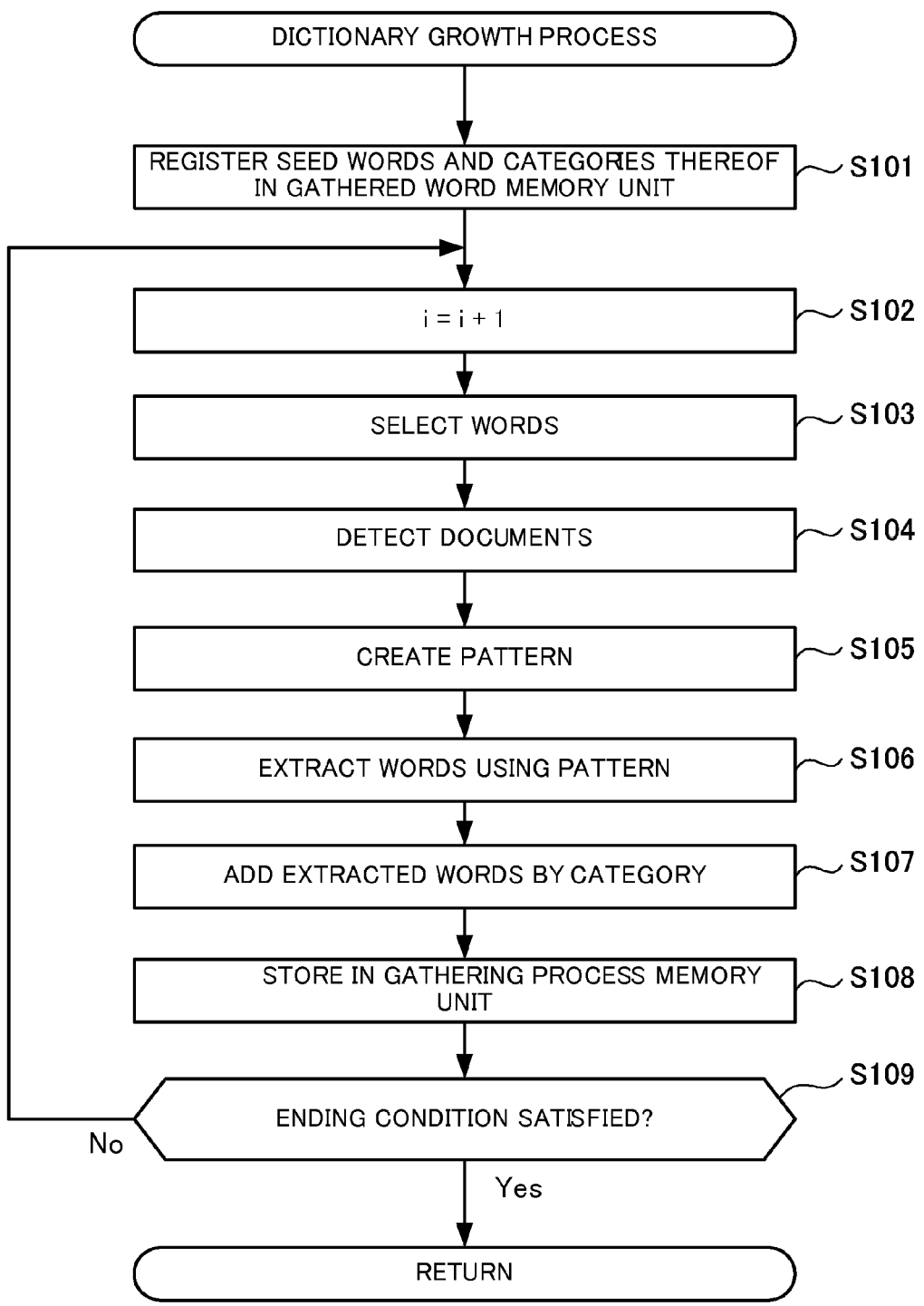
FIG. 5 is a flowchart for explaining actions of the dictionary growth process.

Details of the dictionary growth process (step S100) will be described with reference to the flowchart in FIG. 5. When the dictionary growth process is started, first the dictionary growth unit 102 stores the category names input by the user and seed words belonging to the categories in the gathered-by-category word memory unit 109, associating such with each other (step S101). Furthermore, the dictionary growth unit 102 increments by 1 a counter i (initial value 0) indicating the turn number (step S102).

Next, the dictionary growth unit 102 randomly selects a prescribed number of words from among the words stored in the gathered-by-category word memory unit 109 (step S103). The dictionary growth unit 102 preferably selects words equally from all categories stored in the gathered-by-category word memory unit 109 so that the below-described calculation of category membership degree can be accomplished precisely.

Next, the dictionary growth unit 102 detects documents in which the selected words are included from among the documents stored in the document memory unit 107 (step S104). Here, it is fine to detect only documents containing all of the selected words, or to select documents containing a prescribed number of words from among the selected words.

Next, the dictionary growth unit 102 identifies positions where the words selected in step S103 appear in the detected documents and creates a pattern dividing the selected words and parts others than these (step S105). For example, it would be fine to utilize as a pattern a character string of a prescribed number before and after the area where the selected words appear in the document.

Next, the dictionary growth unit 102 extracts words matching the created pattern from the documents stored in the document memory unit 107 (step S106).

Next, the dictionary growth unit 102 adds the extracted words to the gathered-by-category word memory unit 109, associating each with the category name of the category to which that word belongs (step S107). Here, the category to which a word that is the basis of creating the pattern used in extracting the words belongs (that is to say, one word selected in step S103) is preferably made the category of the extracted words.

For example, when word B is extracted as a word matching the pattern created from word A, this word B is stored in the gathered-by-category word memory unit 109 associated with the same category name as the category to which word A belongs.

Next, the dictionary growth unit 102 coordinates and stores information indicating the current turn number (that is to say, the value of the counter i), each word (input word) selected in step S103, and the words (output words) extracted in step S106 through patterns created from the input words, in the gathering process memory unit 108 (step S108).

Next, the dictionary growth unit 102 determines whether or not a prescribed ending condition for causing dictionary growth to end has been satisfied (step S109). As the ending condition, it is possible to utilize an arbitrary condition such as the number of words recorded in the gathered-by-category word memory unit 109 reaching a prescribed number, or the turn number reaching a prescribed number. In order for the below-described calculation of the category membership degree to be accomplished precisely, it is preferable that the ending condition be set so that gathering of words is repeatedly executed at least two or more turns.

When it is determined that the ending condition has not been satisfied (step S109: No), the dictionary growth unit 102 repeats steps S102 to S108, and the process of gathering words from seed words to which new words are added by category is repeatedly accomplished.

When it is determined that the ending condition has been satisfied (step S109: Yes), the dictionary growth unit 102 ends the dictionary growth process and transitions the process to the boundary word identification unit 103.

Returning to FIG. 4, the boundary word identification unit 103 identifies boundary words by referencing the gathered-by-category word memory unit 109 (step S200). Furthermore, the category membership degree calculation unit 104 calculates the category membership degree of the identified boundary words, on the basis of information recorded in the gathering process memory unit 108 and the gathered-by-category word memory unit 109 (step S300).

Specifically, the category membership degree calculation unit 104 first repeats the input or output of finds the arrival distance (number of inputs/outputs, turn number) for a boundary word to arrive by repeated inputs or outputs at a seed word in the category for each category to which the boundary word belongs. In addition, the category membership degree calculation unit 104 finds the category closeness indicating the degree of connection of words within the category, for each category to which a boundary word belongs. The greater the arrival distance for the boundary word, or the larger the category closeness of a category, the weaker the relationship that boundary word has with that category, in other words the category membership degree is estimated to be small. Accordingly, for example the category membership degree calculation unit 104 can calculate the reciprocal of the product of the arrival distance and the category closeness and assign that as the category membership degree.

An example will now be explained regarding the above-described calculation of the category membership degree.

Figure 6:
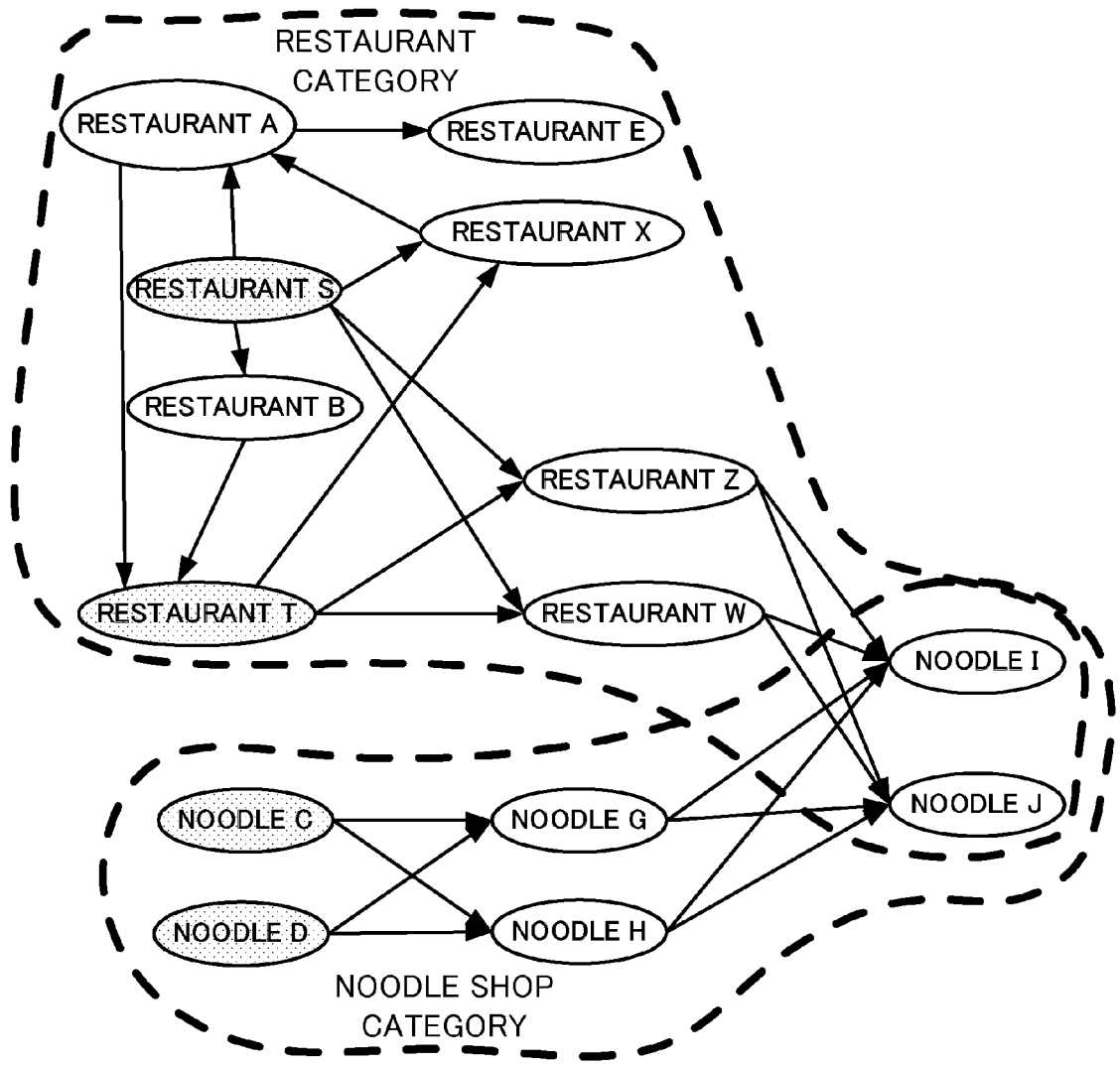
FIG. 6 is a graph illustrating the input/output relationship between words.

FIG. 6 is a drawing illustrating with a graph the input/output relationship among words when the information shown in FIGS. 2 and 3 is stored in the gathering process memory unit 108 and the gathered-by-category word memory unit 109, as a result of the dictionary growth process. In FIG. 6, the words are expressed by nodes and are linked by arcs (arrows) in the direction from the input word to the output word. For example, it can be seen that the word "Restaurant B" was extracted by a pattern created from "Restaurant S." In addition, it can be seen that "Restaurant T" was extracted by a pattern created from the word "Restaurant B." In addition, in FIG. 6 the seed words "Restaurant S," "Restaurant T," "Noodle C" and "Noodle D," which are input words for the first turn, are shown shaded. In addition, words belonging to the restaurant category and to the noodle shop category are shown surrounded by dotted lines. In addition, from this image it can be seen that the words "Noodle I" and "Noodle J" belonging to both categories are boundary words. Below, an example is explained of calculating the category membership degree for the boundary word "Noodle I" in this case.

First, let us consider the restaurant category. From FIG. 6, the boundary word "Noodle I" is output/input from the seed words "Restaurant S" and "Restaurant T" in the restaurant category in as little as two turns from a route such as "Restaurant S→Restaurant Z→Noodle I." Accordingly, the arrival distance is 2.

In addition, the shortest distance (turn number) for each word in the restaurant category to arrive at the seed word "Restaurant S" or "Restaurant T" is 1 for "Restaurant A," "Restaurant B," "Restaurant X," "Restaurant Z" and "Restaurant W," and is 2 for "Restaurant E," "Noodle I" and "Noodle J." Accordingly, averaging these yields 11/8, and the reciprocal of this, 8/11, is assigned as the category closeness of the restaurant category. Furthermore, the reciprocal of the product of the category closeness and the arrival distance is calculated as the category membership degree. That is to say, the category membership degree of "Noodle I" with respect to the restaurant category is 0.69.

Similarly, let us consider the noodle shop category. From FIG. 6, the boundary word "Noodle I" is output/input from the seed words "Noodle C" and "Noodle D" in the restaurant category in as little as two turns from a route such as "Noodle C→Noodle G→Noodle I." Accordingly, the arrival distance is 2.

In addition, the shortest distance (turn number) for each word in the noodle shop category to arrive at the seed word "Noodle C" or "Noodle D" is 1 for "Noodle G" and "Noodle H," and is 2 for "Noodle I" and "Noodle J." Accordingly, averaging these yields 6/4, and the reciprocal of this, 4/6, is assigned as the category closeness of the noodle shop category. Furthermore, the reciprocal of the product of the category closeness and the arrival distance is calculated as the category membership degree. That is to say, the category membership degree of "Noodle I" with respect to the noodle shop category is 0.75.

Returning to FIG. 4, next the category update unit 105 determines the category to which the boundary word belongs on the basis of the calculated category membership degree. Furthermore, the gathered-by-category word memory unit 109 is updated so as to reflect the determination results (step S400).

For example, in the above-described example, for "Noodle I" the category membership degree (0.75) with respect to the noodle shop category is larger than the category membership degree (0.69) with respect to the restaurant category. That is to say, "Noodle I" belongs to the noodle shop category. Accordingly, in this case the category update unit 105 deletes the record of "Noodle I" registered as a restaurant category in the gathered-by-category word memory unit 109.

In addition, from the category membership degree calculated by the same method for the other boundary word "Noodle J," it is determined that this word also belongs to the noodle shop category. Accordingly, the category update unit 105 deletes the record of "Noodle J" registered as a restaurant category in the gathered-by-category word memory unit 109.

Figure 7:
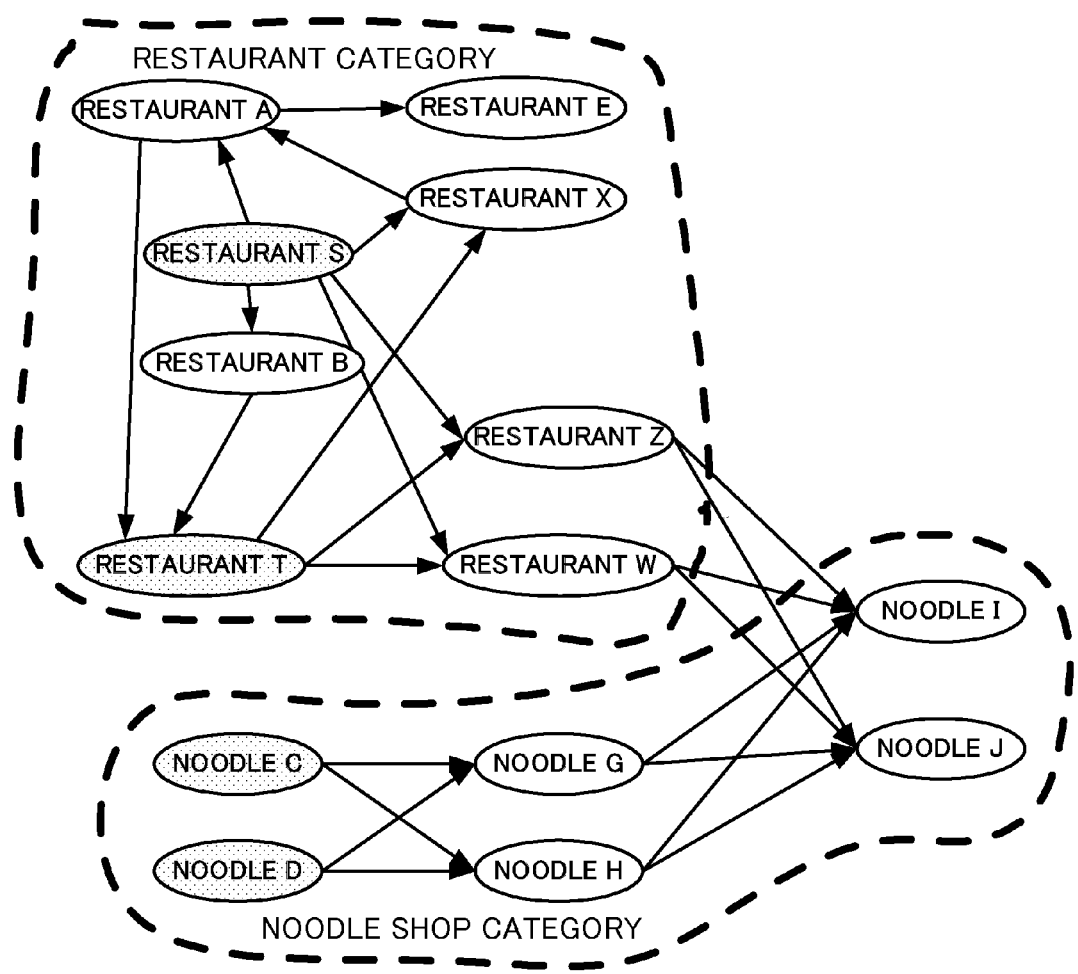
FIG. 7 is a graph illustrating the input/output relationship between words.

Ultimately, each word is classified into the appropriate category, as shown in FIG. 7.

It would also be fine not to determine that the boundary word belongs only to the category with the larger category membership degree as in the above-described example, but to determine that the category to which the boundary word belongs is a category with a category membership degree at least as great as a prescribed threshold value. For example, in the above-described example, if this prescribed threshold value is 0.6, "Noodle I" belongs to both the restaurant and noodle shop categories, and accomplishing the update process by the category update unit 105 becomes unnecessary.

Next, the output unit 106 outputs (displays) words gathered and classified into categories, linking this information, with reference to the gathered-by-category word memory unit 109 (step S500). For example, in the above-described example, the output unit 106 outputs "Restaurant category {Restaurant A, Restaurant B, Restaurant E, Restaurant S, Restaurant T, Restaurant W, Restaurant X, Restaurant Z}, noodle shop category {Noodle C, Noodle D, Noodle G, Noodle H, Noodle I, Noodle J}" and/or the like. With this, the dictionary creation process ends.

In this manner, with the present invention even when words (boundary words) redundantly belonging to multiple categories appear through the dictionary growth process, a category membership degree is calculated for each category to which that boundary word belongs, and the categories are updated on the basis of the calculated category membership degrees. Accordingly, it is possible to appropriately classify gathered words into categories even when similar words are gathered using a dictionary growth process targeting multiple categories.

Second Embodiment

In general, it is known that the greater the arrival distance (number of inputs/outputs) to arrive at a seed word is separated (large) for a word among words in a category, the worse the accuracy of similarity to the seed word becomes. Accordingly, such words could be called an inappropriate word for that category, and are preferably excluded from that category. However, determining the degree to which separation from a seed word makes that word inappropriate for the category has been difficult because there is no suitable standard. With this preferred embodiment, it is possible to use boundary words to easily delete, with a suitable standard, words inappropriate for that category.

Figure 8:
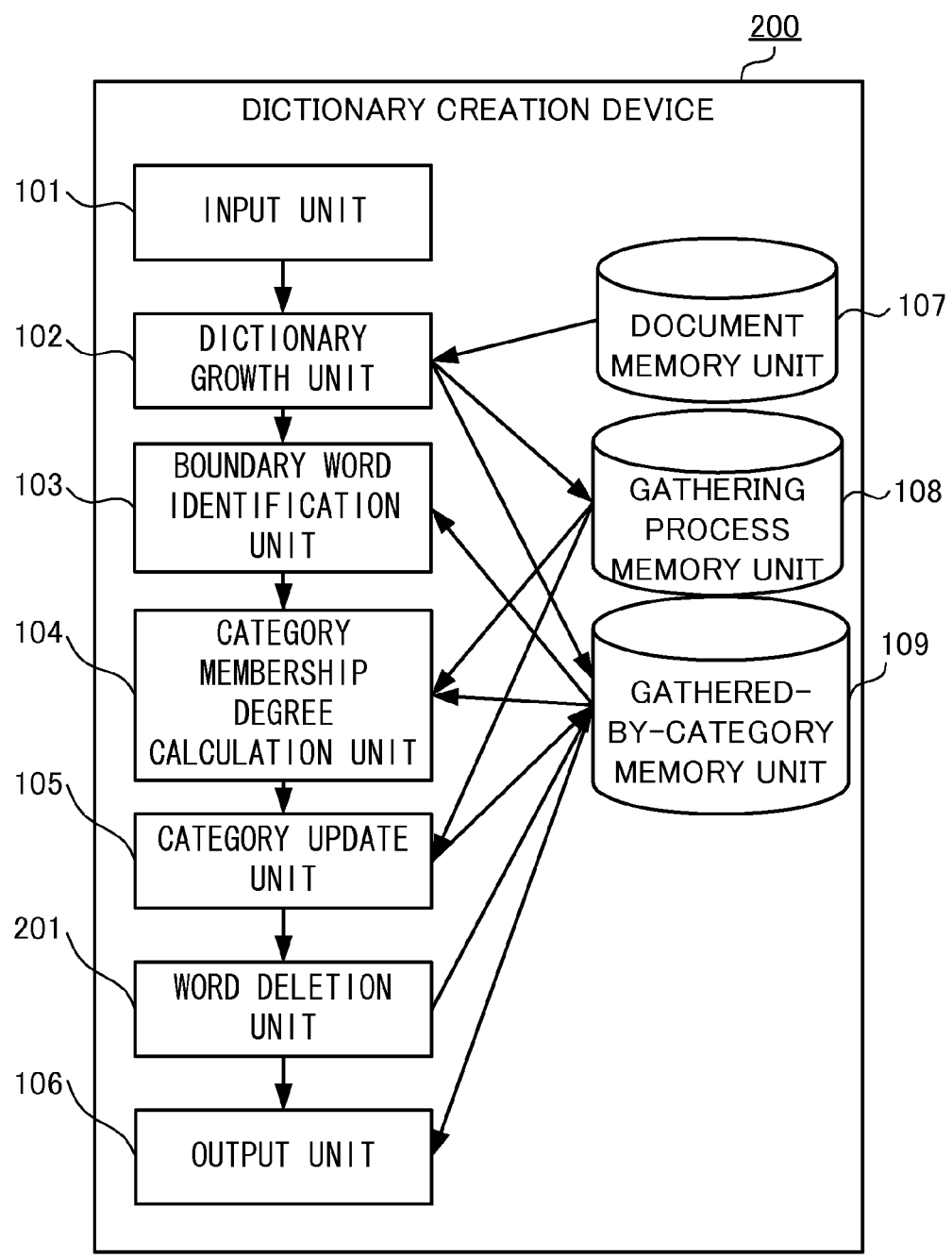
FIG. 8 is a drawing showing the composition of a dictionary creation device according to a second preferred embodiment of the present invention.

The dictionary creation device 200 according to the second preferred embodiment has the composition of the dictionary creation device 100 of the first preferred embodiment to which has been added a word deletion unit 201, as shown in FIG. 8. In the below description and drawings, parts that are the same as in the first preferred embodiment are labeled with the same reference numbers. In addition, a detailed explanation of constituent elements that are the same as the first preferred embodiment is the same as the above explanation for the first preferred embodiment, so detailed explanation is omitted here.

The word deletion unit 201 determines words inappropriate for a category using boundary words updated (classified) into the appropriate category by the category update unit, and deletes words so determined from the gathered-by-category word memory unit 109. Details of the processes accomplished by the word deletion unit 201 are described below.

The various other parts (the input unit 101, the dictionary growth unit 102, the boundary word identification unit 103, the category membership degree calculation unit 104, the category update unit 105, the output unit 106, the document memory unit 107, the gathering process memory unit 108 and the gathered-by-category word memory unit 109) accomplish the same processes as in the first preferred embodiment, so explanation is omitted here.

Next, actions of the process implemented by the dictionary creation device 200 will be explained.

Figure 9:
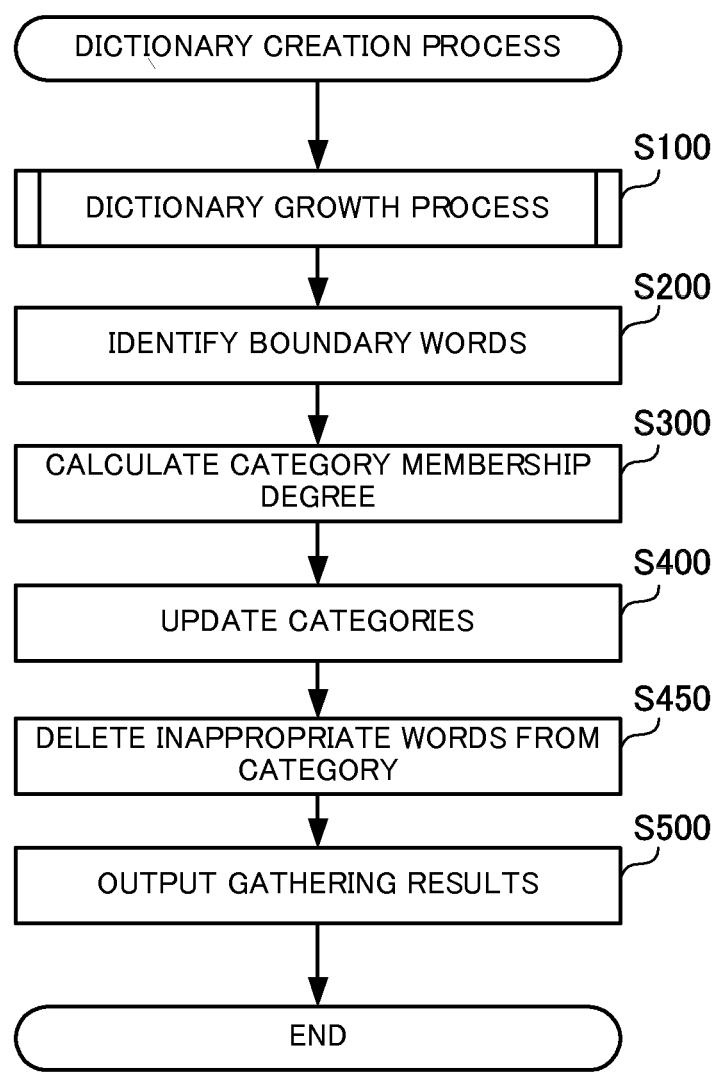
FIG. 9 is a flowchart for explaining actions of the dictionary creation process.

In accordance with the same directive operation as in the first preferred embodiment, the dictionary creation device 200 accomplishes the dictionary creation process shown in FIG. 9.

When the dictionary creation process starts, the dictionary creation device 200 accomplishes the same processes from step S100 through step S400. That is to say, first the dictionary growth unit 102 accomplishes the dictionary growth process and gathers words into categories (step S100). Then, the boundary word identification unit 103 identifies boundary words with reference to the gathered-by-category word memory unit 109 (step S200). Then, the category membership degree calculation unit 104 calculates the category membership degree of the boundary words (step S300). At this time, the category membership degree calculation unit 104 preserves in an unrepresented memory unit and/or the like the arrival distance for the boundary words to arrive at the seed words in the category as found by the category membership degree calculation, associating such with the category name and the seed word. Next, the category update unit 105 determines the category to which the boundary word belongs on the basis of the category membership degree, and updates the gathered-by-category word memory unit 109 so as to reflect the determination results (step S400).

Next, the word deletion unit 201 determines words that are inappropriate for the category on the basis of the arrival distance of the boundary word to the seed words, and deletes words so determined from the gathered-by-category word memory unit 109 (Step S450).

The process accomplished by the word deletion unit 201 will be described here using a specific example. As an assumption, suppose that through the above-described series of processes (step S100 through step S300), various words are gathered through category classification as shown in FIG. 6, and through the process of step S400, the boundary words "Noodle I" and "Noodle J" are classified into an appropriate category (noodle shop) on the basis of the category membership degree and ultimately the various words are gathered in category classifications such as those shown in FIG. 7.

Let us first consider the noodle shop category. Referencing FIG. 7, it can be seen that the boundary words "Noodle I" and "Noodle J" classified as members of the noodle shop category have a distance of at least two to arrive at the seed words "Noodle C" and "Noodle D" in the noodle shop category. Accordingly, using this as the standard, the word deletion unit 201 leaves only words with an arrival distance within two of the seed words in the noodle shop category and deletes other words. As shown in FIG. 7, because all words in the noodle shop category have a shortest arrival distance to the seed words "Noodle C" and "Noodle D" within two, the word deletion process by the word deletion unit 201 is not implemented in the noodle shop category.

Let us next consider the restaurant category. Referencing FIG. 7, it can be seen that the boundary words "Noodle I" and "Noodle J" removed from the restaurant category have a distance of at least 2 to arrive at the seed words "Restaurant S" and "Restaurant T" in the restaurant category. Accordingly, using this as the standard, the word deletion unit 201 removes words with an arrival distance to the seed words of at least two from the restaurant category. As shown in FIG. 7, out of all the words in the restaurant category, the word with a minimum arrival distance of at least 2 to the seed words "Restaurant S" and "Restaurant T" is "Restaurant E." Accordingly, the word deletion unit 201 deletes the record of "Restaurant E" registered as the restaurant category in the gathered-by-category word memory unit 109.

Returning to FIG. 9, next the output unit 106 classifies into categories and outputs (displays) the gathered words referencing the gathered-by-category word memory unit 109, the same as in the first preferred embodiment (step S500). For example, in the case of the above-described example, the output unit 106 outputs "Restaurant category {Restaurant A, Restaurant B, Restaurant E, Restaurant S, Restaurant T, Restaurant W, Restaurant X, Restaurant Z}, noodle shop category {Noodle C, Noodle D, Noodle G, Noodle H, Noodle I, Noodle J}" and/or the like. With this, the dictionary creation process ends.

In this manner, with this preferred embodiment words suitable for membership in a category are determined on the basis of the arrival distance to that seed word, with the boundary words as a standard. Accordingly, words inappropriate for a category can be easily deleted using an appropriate standard.

Third Embodiment

In the first preferred embodiment and the second preferred embodiment, the optimum category was identified by calculating the category membership degree for each category for boundary words classified into multiple categories in the dictionary growth process. With this preferred embodiment, the optimum category is identified by classifying the gathered words into clusters based on the input/output relationship and calculating the category membership degree for a cluster (boundary cluster) containing boundary words.

Figure 10:
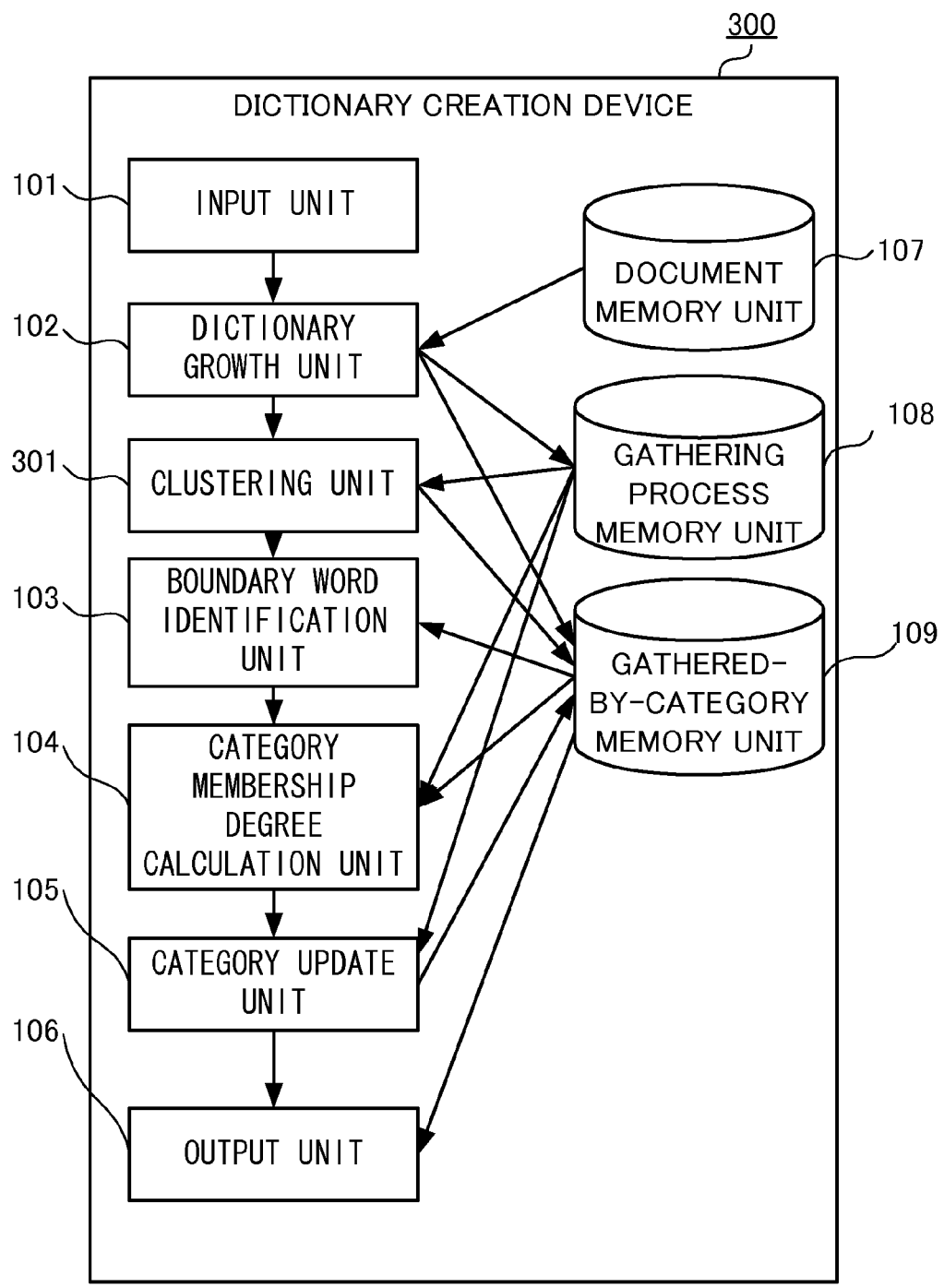
FIG. 10 is a drawing showing the composition of a dictionary creation device according to a third preferred embodiment of the present invention.

The dictionary creation device 300 according to the third preferred embodiment is the dictionary creation device 100 of the first preferred embodiment to which a clustering unit 301 has been added, as shown in FIG. 10. In the below description and drawings, parts that are the same as in the first preferred embodiment are labeled with the same reference numbers. In addition, a detailed explanation of constituent elements that are the same as the first preferred embodiment is the same as the above explanation for the first preferred embodiment, so detailed explanation is omitted here.

The clustering unit 301 classifies (clusters) words gathered by the dictionary growth unit 102 into multiple clusters on the basis of the information stored in the gathering process memory unit 108. Details of the process accomplished by the clustering unit 301 are described below.

In addition, with this preferred embodiment, the category membership degree calculation unit 104 calculates a category membership degree indicating the degree to which a cluster containing boundary words (hereafter called a boundary cluster) is composed of words belonging to that category, on the basis of information stored in the gathering process memory unit 108 and the gathered-by-category word memory unit 109.

Specifically, the category membership calculation unit 104 calculates the category membership degree for each of the words in the boundary cluster, and calculates the average value thereof as the category membership degree of the boundary cluster. It would also be fine for the minimum value of the category membership degrees of words in the boundary cluster to be used as the category membership degree of the boundary cluster.

In addition, with this preferred embodiment, cluster names identifying clusters classified by the clustering unit 301 are stored in the gathered-by-category word memory unit 109 associated with words belonging to that cluster, as shown in FIG. 11.

The various other parts (the input unit 101, the dictionary growth unit 102, the boundary word identification unit 103, the category update unit 105, the output unit 106, the document memory unit 107 and the gathering process memory unit 108) accomplish the same processes as in the first preferred embodiment, so explanation is omitted here.

Next, actions of the process implemented by the dictionary creation device 300 will be explained.

Figure 12:
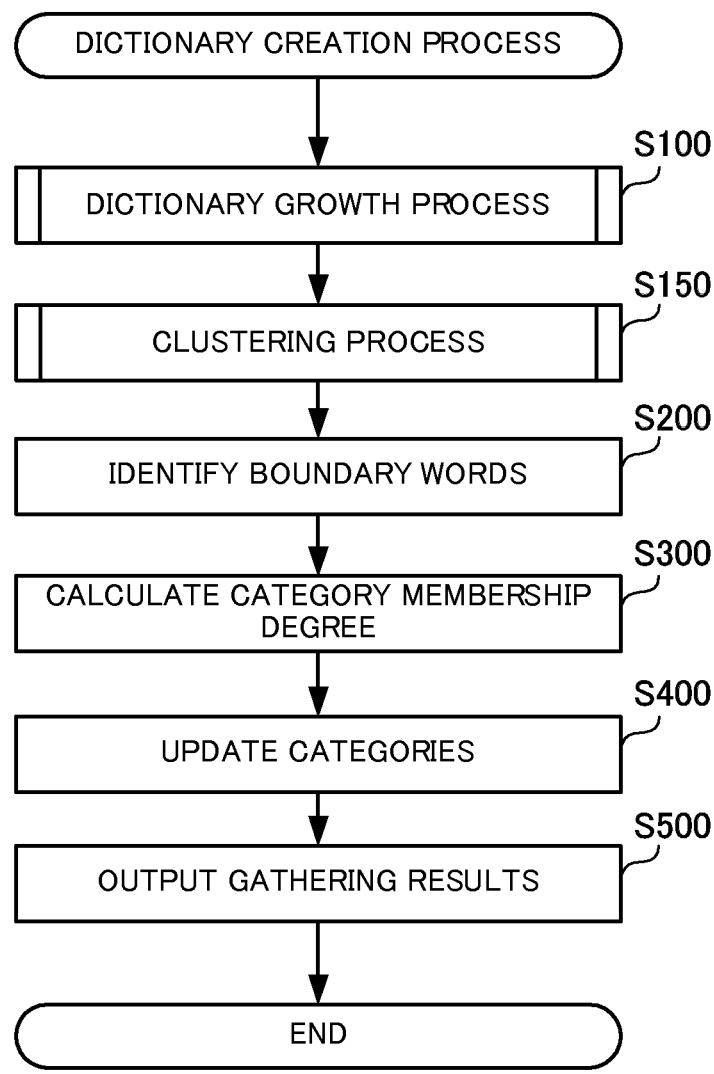
FIG. 12 is a flowchart for explaining actions of the dictionary creation process.

In accordance with the same directive operation as in the first preferred embodiment, the dictionary creation device 300 accomplishes the dictionary creation process shown in FIG. 12.

When the dictionary creation process starts, first the dictionary growth unit 102 accomplishes the dictionary growth process and gathers words by category, the same as in the first preferred embodiment (step S100).

Next, the clustering unit 301 accomplishes a clustering process that classifies the words gathered by the dictionary growth process into clusters (step S150).

Figure 13:
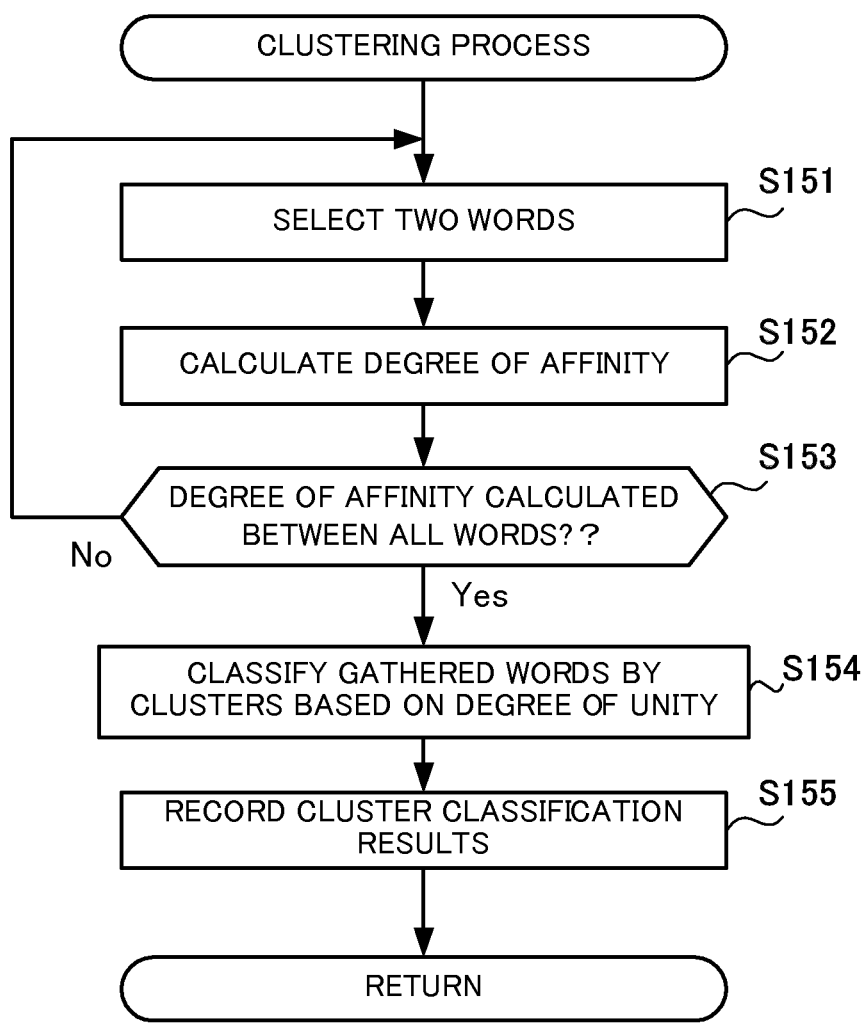
FIG. 13 is a flowchart for explaining actions of the clustering process.

FIG. 13 is a flowchart showing details of the clustering process (step S150). When the clustering process begins, first the clustering unit 301 selects two words for which the degree of affinity between words has not yet been calculated from the gathered-by-category word memory unit 109 (step S151).

Next, the clustering unit 301 calculates the degree of affinity between the two selected words on the basis of the information stored in the gathering process memory unit 108 (step S152).

The degree of unity between the words is an indicator that becomes larger between words which have common words as inputs or between words that output common words in the above-described dictionary growth process. For example, it is possible to calculate as the degree of affinity between two words the sum of the ratio of the common words by which the two words were input out of the words by which the two words were respectively input, and the ratio of the common words the two words output out of the words the two words respectively output.

More specifically, taking the degree of affinity between two words a and b to be Sim(a,b), the degree of unity can be calculated from the following formula.

$$\text{Sim}(a,b) = \text{Sim\_in}(a,b) + \text{sim\_out}(a,b).$$

In this equation, Sim_in(a,b) is a value indicating the ratio of the words input from common words out of the words respectively input into the words a and b. Sim_in(a,b) can be found as (number of common words input into both word a and word b)/((number of words input into word a)+(number of words input into word b)).

In addition, Sim_out(a,b) is a value indicating the ratio of the words outputting common words out of the words the two words a and b respectively output. Sim_out(a,b) can be found as (number of common words output from both word a and word b)/((number of words output by word a)+(number of words output by word b)).

Next, the clustering unit 301 determines whether or not the degree of unity has been calculated for all sets of words stored in the gathered-by-category word memory unit 109 (step S153).

When the degree of affinity has not been calculated for all sets of words (step S153: No), the clustering unit 301 selects two seed words for which the degree of affinity has not been calculated and repeats the process of calculating the degree of affinity (steps S151 and S152).

When the degree of affinity has been calculated for all sets of seed words (step S153: Yes), the clustering unit 301 accomplishes clustering using a commonly known clustering method such as a shortest distance method, longest distance method or a group average method, and classifies the words stored in the gathered-by-category word memory unit 109 into multiple clusters (step S154).

Furthermore, the clustering unit 301 records the results of clustering (step S155). Specifically, the clustering unit 301 appends cluster names to each word stored in the gathered-by-category word memory unit 109 so that the results of classification into clusters are reflected. With this, the clustering process ends.

In this manner, through the clustering process the degree of affinity between gathered words is calculated and the gathered words are classified into multiple clusters on the basis of the calculated degree of affinity.

Figure 14:
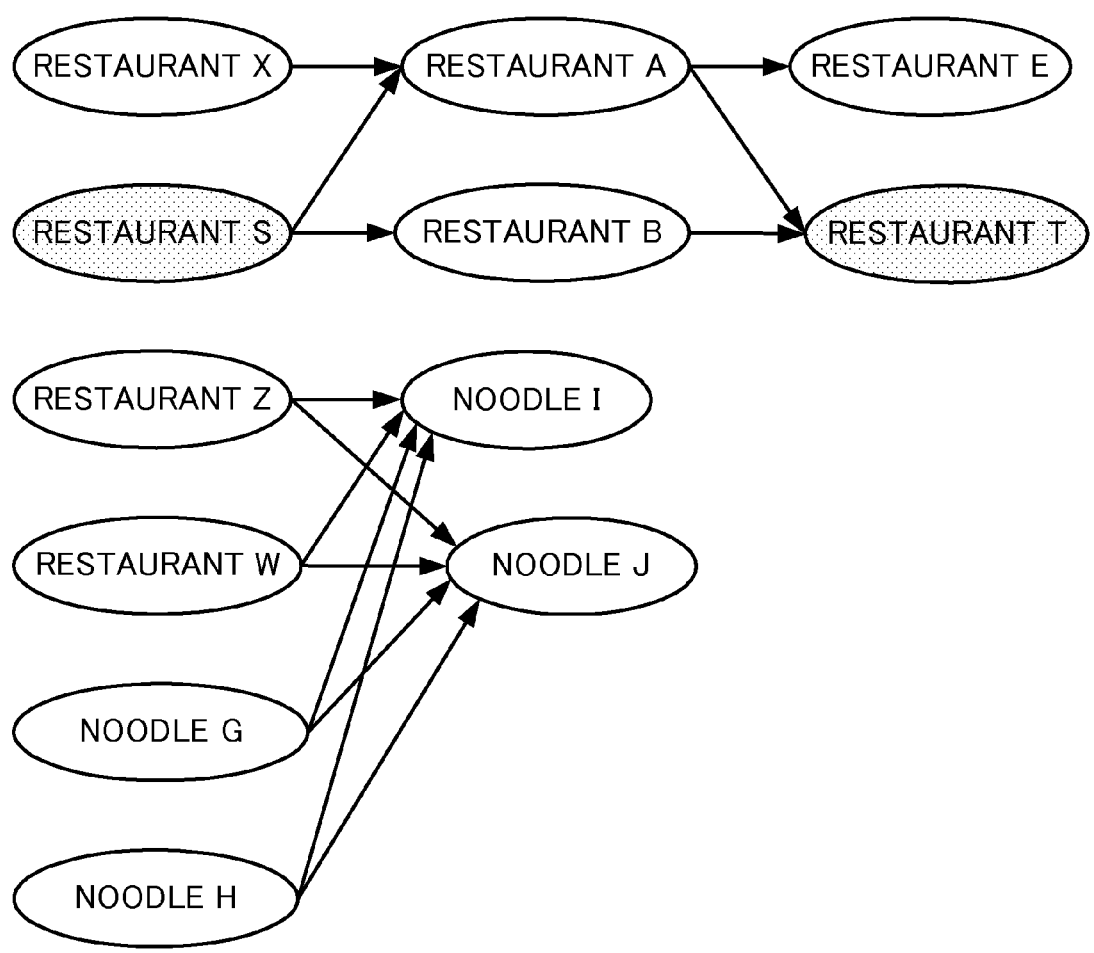
FIG. 14 is a graph illustrating the input/output relationship between words.

A specific example will now be given and explained for the above-described clustering process. FIG. 14 is a drawing graphically showing the relationship among the input and output of each word of "Restaurant A," "Restaurant B," "Noodle I," and "Noodle J" when the information shown in FIG. 2 is stored in the gathering process memory unit 108. In FIG. 14, the words are expressed by nodes and are linked by arcs (arrows) in the direction of output words from input words.

Let us consider the case of calculating the degree of unity Sim(A,B) between "Restaurant A" and "Restaurant B."

Words input to "Restaurant A" are "Restaurant X" and "Restaurant S," and the word input to "Restaurant B" is "Restaurant S." Furthermore, of these "Restaurant S" is input to both "Restaurant A" and "Restaurant B." Accordingly, Sim_in(A,B) is ⅓. In addition, words output by "Restaurant A" are "Restaurant E" and "Restaurant T," and the word output by "Restaurant B" is "Restaurant T." Furthermore, of these "Restaurant T" is output from both "Restaurant A" and "Restaurant B." Accordingly, Sim_out (A,B) is ⅓. Accordingly, the degree of unity is calculated as Sim(A,B)=Sim_in(A,B)+Sim_out(A,B)=⅓+⅓=⅔.

Similarly, the degree of affinity among other words is calculated as follows:

The degree of affinity between restaurant A and noodle I: Sim(A,I)=Sim_in(A,I)+Sim_out(A,I)=0+0=0.

The degree of affinity between restaurant A and noodle J: Sim(A,J)=Sim_in(A,J)+Sim_out(A,J)=0+0=0.

The degree of affinity between restaurant B and noodle I: Sim(B,I)=Sim_in(B,I)+Sim_out(B,I)=0+0=0.

The degree of affinity between restaurant B and noodle J: Sim(B,J)=Sim_in(B,J)+Sim_out(B,J)=0+0=0.

The degree of affinity between noodle I and noodle J: Sim(I,J)=Sim_in(I,J)+Sim_out(I,J)=4/8+0=1/2.

Furthermore, clustering is accomplished using a commonly known clustering method with this degree of affinity among the words as the degree of similarity. For example, from this degree of unity two clusters are created, namely cluster 1 {Restaurant A, Restaurant B} and cluster 2 {Noodle I, Noodle J}, and as shown in FIG. 11, the category name is appended to these words stored in the gathered-by-category word memory unit 109.

Returning to FIG. 12, the boundary word identification unit 103 identifies boundary words with reference to the gathered-by-category word memory unit 109 the same as in the first preferred embodiment (step S200). In the above-described example, "Noodle I" and "Noodle J" are identified as boundary words, the same as in the first preferred embodiment.

Next, the category membership degree calculation unit 104 calculates the category membership degree of the boundary clusters to which the boundary words belong (step S300).

Calculation of the category membership degree for the boundary clusters in the above-described example will be explained in detail. In the above-described example, the boundary words are "Noodle I" and "Noodle J", so the cluster 2 containing these words is a boundary cluster.

First, the category membership degree calculation unit 104 calculates the category membership degree for each of the words "Noodle I" and "Noodle J" within the boundary cluster (cluster 2) using the same method as in the first preferred embodiment. That is to say, the category membership degree can be calculated as the reciprocal of the product of the category closeness and the arrival distance. Accordingly, when the category membership degree of word A in category α is category membership degree (A,α), the category membership degrees of each word in the boundary cluster are calculated as follows:

Category membership degree ("Noodle I", restaurant)=0.69

Category membership degree ("Noodle I", noodle shop)=0.75

Category membership degree ("Noodle J", restaurant)=0.69

Category membership degree ("Noodle J", noodle shop)=0.75

Next, the category membership degree calculation unit 104 calculates the average value (or minimum value) by category of the category membership degree found for each word, as the category membership degree of the boundary cluster. Accordingly, the category membership degree of cluster 2 is found as follows:

Category membership degree of cluster 2 with respect to the restaurant category: 0.69.

Category membership degree of cluster 2 with respect to the noodle shop category: 0.75.

Next, the category update unit 105 determines the categories to which the words in the boundary cluster belong on the basis of the calculated category membership degree of the boundary cluster. Furthermore, the category update unit 105 updates the gathered-by-category word memory unit 109 so t as to reflect the determination results (step S400).

For example, in the above-described example, it can be seen that for cluster 2 which is a boundary cluster the category membership degree (0.75) with respect to the noodle shop category is larger than the category membership degree (0.69) with respect to the restaurant category. Thus, the words "Noodle I" and "Noodle J" within the cluster 2 belong to the noodle shop category. Accordingly, in this case the category update unit 105 deletes the records of the words "Noodle I" and "Noodle J" in cluster 2 registered as the restaurant category in the gathered-by-category word memory unit 109.

Next, the output unit 106 outputs (displays) the words gathered and classified into categories with reference to the gathered-by-category word memory unit 109, linking each with the respective information, the same as in the first preferred embodiment (step S500). The output unit 106 may also append to the word and output the cluster name of the cluster classified in step S150.

In this manner, with this preferred embodiment the gathered words are clustered. Furthermore, the category membership degrees with respect to boundary clusters are calculated and words in boundary clusters can be classified into an appropriate category on the basis of the category membership degree.

The above-described preferred embodiments may have various forms and applications.

For example, with the above-described preferred embodiments, a word is extracted from a document stored in the document memory unit 107, but this is not intended to be limiting, for words may also be extracted from Web pages on the Internet using an Internet search engine.

In addition, with the above-described preferred embodiments, the reciprocal of the product of the category closeness and arrival distance was found as the category membership degree, but this is merely one example, for it would be fine to calculate the category membership degree using other calculation formulae. For example, it would be fine to calculate as the category membership degree the sum of the reciprocal of the category closeness and the reciprocal of the arrival distance. In addition, it would be fine to calculate the category membership degree from values found by multiplying the category closeness and the arrival distance respectively with prescribed weighted coefficients. In addition, it would be fine to not calculate the category closeness and to calculate the category membership degree from the arrival distance.

In addition, with the above-described preferred embodiments the category closeness was calculated as the reciprocal of the average values of the arrival distance to the seed words for each word in a category. However, this is not intended to be limiting, and for example it would be fine to use as the category closeness a value (network closeness) found by dividing the number of combinations with an input/output relationship among the words in the category by the number of combinations of all words in the category, with reference to the gathering process memory unit 108.

Figure 15:
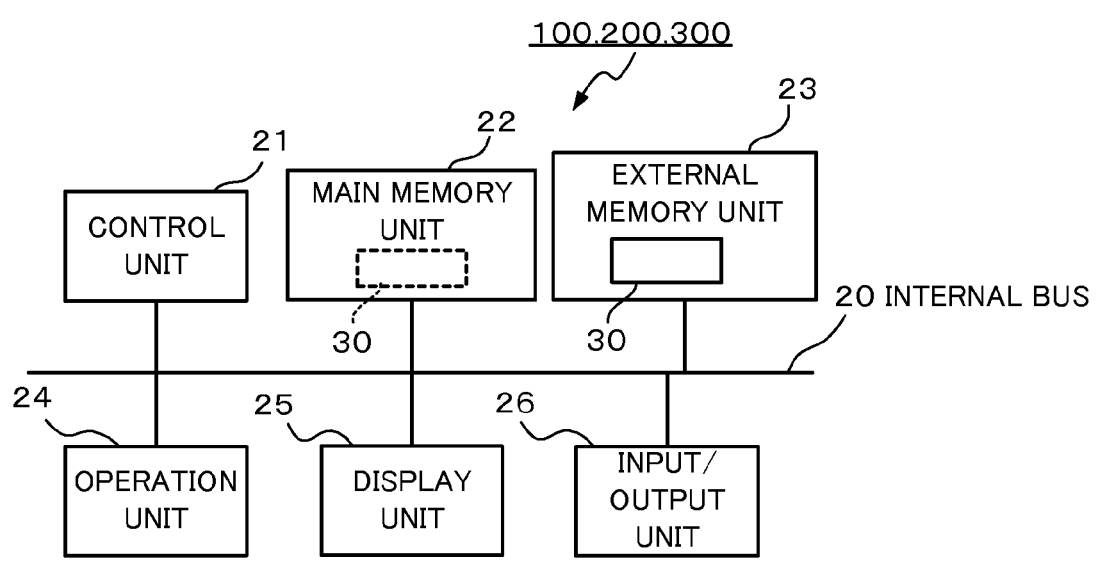
FIG. 15 is a block diagram showing one example of the physical composition when a dictionary creation device according to the preferred embodiments is implemented in a computer.

FIG. 15 is a block diagram showing one example of the physical composition when the dictionary creation devices 100, 200 and 300 according to the preferred embodiments of the present invention are implemented on a computer. The dictionary creation devices 100, 200 and 300 according to the preferred embodiments of the present invention can be realized by the same hardware composition as a typical computer device. The dictionary creation devices 100, 200 and 300 are provided with a control unit 21, a main memory unit 22, an external memory unit 23, an operation unit 24, a display unit 25 and an input/output unit 26. The main memory unit 22, external memory unit 23, operation unit 24, display unit 25 and input/output unit 26 are all connected to the control unit 21 via an internal bus 20.

The control unit 21 is composed of a CPU (Central Processing Unit) and/or the like and executes the dictionary creation process in the above-described preferred embodiments in accordance with a control program stored in the external memory unit 23.

The main memory unit 22 is composed of a RAM (Random-Access Memory) and/or the like and loads the control program stored in the external memory unit 23, and is used as a word area for the control unit 21.

The external memory unit 23 is composed of non-volatile memory such as flash memory, a hard disk, DVD-RAM (Digital Versatile Disc Random-Access memory), DVD-RW (Digital Versatile Disc ReWritable) and/or the like, and stores in advance the control program 30 for causing the control unit 21 to execute the above-described processes. In addition, the external memory unit 23 supplies data this control program 30 stores to the control unit 21 in accordance with instructions from the control unit 21, and stores the data supplied from the control unit 21. In addition, the external memory unit 23 physically realizes the document memory unit 107, the gathering process memory unit 108 and the gathered-by-category word memory unit 109 in the above-described preferred embodiments.

The operation unit 24 is composed of a keyboard and a pointing device such as a mouse and/or the like, and an interface device and/or the like connecting the keyboard and pointing device and/or the like to the internal bus 20. Seeds words and instructions to start the dictionary creation process are supplied to the control unit 21 via the operation unit 24.

The display unit 24 is composed of a CRT (Cathode Ray Tube) or an LCD (Liquid Crystal Display) and/or the like, and displays various information. For example, the display unit 25 displays the various gathered words with the category name to which such belong appended.

The input/output device 26 is composed of a wireless transceiver, a wireless modem or a network terminus device, and a series interface or LAN (Local Area Network) interface and/or the like connected to such. For example, words may be gathered from Web pages on the Internet via the input/output unit 26.

The processes of the dictionary growth unit 102, the boundary word identification unit 103, the category membership degree calculation unit 104, the category update unit 105, the output unit 106, the word deletion unit 201 and the clustering unit 301 of the dictionary creation devices 100, 200 and 300 shown in FIGS. 1, 8 and 10 are executed by the control program 30 processing using as resources the control unit 21, the main memory unit 22, the external memory unit 23, the operation unit 24, the display unit 25 and the input/output unit 26.

The above-described hardware composition and flowcharts are one example, and this can be altered or modified at will.

In addition, the central part for accomplishing the processes of the dictionary creation devices 100, 200 and 300 composed of the control unit 21, the main memory unit 22, the external memory unit 23, the operation unit 24, the input/output unit 26 and the internal bus 20 and/or the like need not be a specialized system but can be realized using a normal computer system. For example, the dictionary creation devices 100, 200 and 300 for executing the above-described processes may be composed by storing and distributing the computer program for executing the above actions on a computer-readable storage recording medium (flexible disc, CD-ROM, DVD-ROM and/or the like) and by installing this computer program on a computer. In addition, the dictionary creation devices 100, 200 and 300 may be composed by storing the computer program on a memory device possessed by a server device on a communication network such as the Internet and/or the like and having a normal computer system download such.

In addition, when the functions of the dictionary creation devices 100, 200 and 300 are realized through division of responsibility between an OS (operating system) and application programs, or through cooperation between an OS and application programs, it is fine to store only the application program part on a recording medium or storage device.

In addition, it is possible to superimpose a computer program on carrier waves and distribute such via a communication network. For example, it would be fine to distribute the above-described computer program via a network by posting the above-described computer program on a bulletin board system (BBS) on a communication network. Furthermore, it would be fine to have a composition such that the above-described processes can be executed by launching this computer program and similarly executing other application programs under the control of the OS.

This application claims the benefit of Japanese Patent Application 2009-282305, filed 11 Dec. 2009, the entire disclosure of which is incorporated by reference herein.

EXPLANATION OF SYMBOLS

100 Dictionary creation device
101 Input unit
102 Dictionary growth unit
103 Boundary word identification unit
104 Category membership degree calculation unit
105 Category update unit
106 Output unit
107 Document memory unit
108 Gathering process memory unit
109 Gathered-by-category word memory unit

The invention claimed is:

1. A dictionary creation device comprising:
a dictionary growth unit which is implemented by a processor and configured for performing dictionary growth processes of gathering words in each category by repeatedly outputting from document data including input words, words related to the input words as output words and adding the output words to the input words until end conditions are reached;
a gathering process memory unit which is implemented by the processor and configured for recording, as information indicating an input/output process, a combination of the number of turns that is required to reach the output words from the first input words, the input words, and the output words related to the input words;
a gathered-by-category word memory unit which is implemented by the processor and configured for storing words gathered by the dictionary growth process by category;
a boundary word identification unit which is implemented by the processor and configured for identifying boundary words belonging to multiple categories out of the words gathered by the dictionary growth process;
a category membership degree calculation unit which is implemented by the processor and configured for calculating a category membership degree indicating the extent to which a boundary word belongs to the categories for each category to which the boundary word belongs, so that the category membership degree may become high, when the boundary word turns into an input word of the category, or when the boundary word turns into an output word of the category, on the basis of the information recorded in the gathering process memory unit; and
a category update unit which is implemented by the processor and configured for determining one category to which the boundary words belong on the basis of category membership degrees calculated by the category membership degree calculation unit, and updating information stored in the gathered-by-category word memory means so as to reflect the determination results;
wherein the category membership calculation unit calculates category membership degrees of the boundary words with respect to the categories on the basis of a minimum number of turns until the first input words in the dictionary growth process in categories to which the boundary words belong arrive at the boundary words.

2. The dictionary creation device of claim 1, wherein the category membership degree calculation unit calculates category membership degrees of the boundary words with respect to the categories on the basis of a category closeness indicating the extent to which words in categories to which the boundary words belong are linked.

3. The dictionary creation device of claim 1, wherein the category membership degree calculation unit finds the category closeness on the basis of the average value of the minimum number of turns until the first input words in the dictionary growth process in categories to which the boundary words belong arrive at each word in the category.

4. The dictionary creation device of claim 1, wherein the category membership degree calculation unit finds the category closeness on the basis of the ratio of words having an input/output relationship to the words in the category to which the boundary words belong.

5. The dictionary creation device of claim 1, further comprising:
means for updating the gathered-by-category word memory unit so as to exclude from, categories to which the category update unit has determined that the boundary words do not belong, words that the number of turns from the first input words in the dictionary growth process within the category is equal to or greater than the minimum number of turns until the first input words arrive at the boundary words.

6. The dictionary creation device of claim 1, further comprising a cluster classification unit which is implemented by the processor and configured for classifying words gathered by the dictionary growth process into clusters on the basis of information recorded in the gathering process memory unit;
wherein the category membership calculation unit finds the category membership degree for each word in a boundary cluster containing the boundary words and sets the average value or minimum value thereof as a category membership degree for the boundary cluster; and
the category update unit determines categories to which words in the boundary clusters belong on the basis of the category membership degree of the boundary cluster, and updates information stored in the gathered-by-category word memory unit so as to reflect the determination results.

7. The dictionary creation device of claim 6, wherein the cluster classification unit calculates a degree of affinity between words indicating a value that becomes larger among words that are input by common words or among words that output common words out of the words gathered by the dictionary growth process, from information recorded in the gathering process memory unit, and classifies words into clusters on the basis of the calculated degree of affinity.

8. A word gathering method comprising:
a dictionary growth step for performing dictionary growth processes of gathering words in each category by repeatedly outputting from document data including input words, words related to the input words as output words and adding the output words to the input words until end conditions are reached:
a gathering process memory step for recording, as information indicating an input/output process, a combination of the number of turns that is required to reach the output words from the first input words, the input words, and the output words related to the input words:
a gathered-by-category word memory step for storing words gathered by the dictionary growth process by category;
a boundary word identification step for identifying boundary words belonging to multiple categories out of the words gathered by the dictionary growth process;
a category membership degree calculation step for calculating a category membership degree indicating the extent to which the boundary words belong to the categories for each category to which the boundary words belong, so that the category membership degree may become high, when the boundary word turns into an input word of the category, or when the boundary word turns into an output word of the category, on the basis of the information recorded in the input/output process recording step; and
a category update step for determining one category to which the boundary words belong on the basis of category membership degrees calculated by the category membership degree calculation step, and updating information stored in the gathered-by-category word memory step so as to reflect the determination results;
wherein the category membership degree calculation step calculates category membership degrees of the boundary words with respect to the categories on the basis of a minimum number of inputs/outputs pertaining to each boundary word until the first input words in the dictionary growth process in categories to which the boundary words belong arrive at the boundary words by repeating input/output.

9. A non-volatile computer-readable recording medium on which is recorded a program that causes a computer to function as:
dictionary growth means for performing dictionary growth processes of gathering words in each category by repeatedly outputting from document data including input words, words related to the input words as output words and adding the output words to the input words until end conditions are reached: gathering process memory means for recording, as information indicating an input/output process, a combination of the number of turns that is required to reach the output words from the first input words, the input words, and the output words related to the input words:
gathered-by-category word memory means for storing words gathered by the dictionary growth process by category;
boundary word identification means for identifying boundary words belonging to multiple categories out of the words gathered by the dictionary growth process;
category membership degree calculation means for calculating a category membership degree indicating the extent to which the boundary words belong to the categories for each category to which the boundary words belong, so that the category membership degree may become high, when the boundary word turns into an input word of the category, or when the boundary word turns into an output word of the category, on the basis of the information recorded in the gathering process memory means; and
category update means for determining one category to which the boundary words belong on the basis of category membership degrees calculated by the category membership degree calculation means, and updating information stored in the gathered-by-category word memory means so as to reflect the determination results;
wherein the category membership degree calculation means calculates category membership degrees of the boundary words with respect to the categories on the basis of a minimum number of inputs/outputs pertaining to each boundary word until the first input words in the dictionary growth process in categories to which the boundary words belong arrive at the boundary words by repeating input/output.

* * * * *